Figure 1:
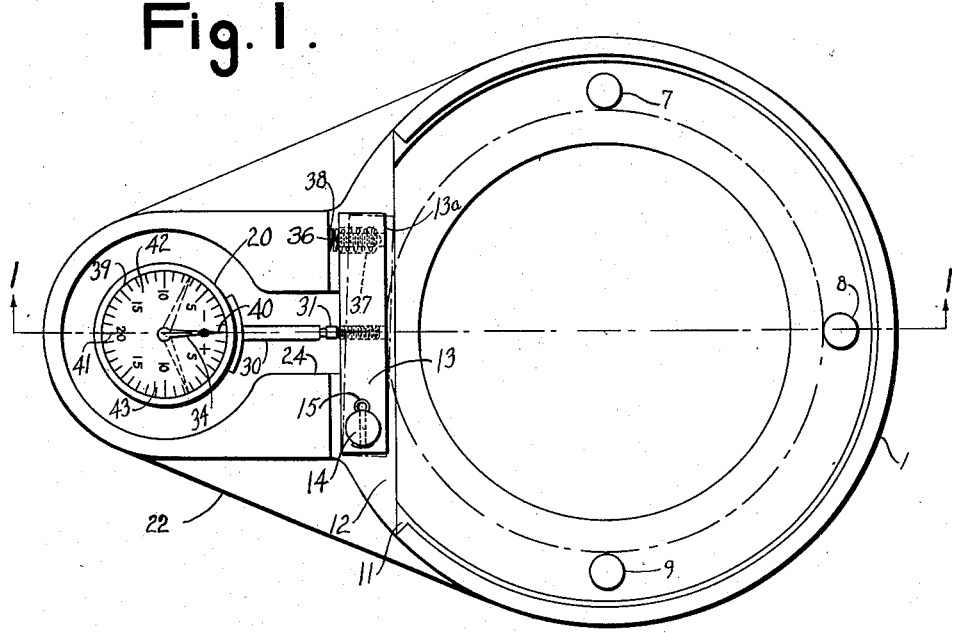

Oct. 10, 1950     H. W. INGLE     2,525,136
GAUGE FOR THREADED OR OTHER FINISH
PORTIONS OF JARS AND THE LIKE
Filed Aug. 12, 1946

INVENTOR
HENRY W. INGLE
BY Parham & Bates
ATTORNEYS

Patented Oct. 10, 1950

2,525,136

UNITED STATES PATENT OFFICE 2,525,136

GAUGE FOR THREADED OR OTHER FINISH PORTIONS OF JARS AND THE LIKE

Henry W. Ingle, Windsor, Conn., assignor to Hartford-Empire Company, Hartford, Conn., a corporation of Delaware Application August 12, 1946, Serial No. 689,844

3 Claims. (Cl. 33—178)

This invention relates generally to improvements in gauges for the rim or finish portion of jars or the like and more particularly to a gauge for the outer peripheral surfaces of glass jars or other containers, especially those which are to be hermetically sealed by the application thereto of sealing gaskets and threaded or otherwise secured closure caps.

Glass jars or other containers of the character described should have external sealing or threaded surfaces which will meet rigid specifications as to their size, shape, regularity of surface, etc. Otherwise, they cannot be satisfactorily capped and sealed or, if the departures of their threaded and sealing surfaces from the specified requirements are excessive, they cannot be capped and sealed at all. Threaded jars, having oversize major thread diameters, cannot be capped properly because of the binding action between the mating thread of the cap or closure and the container thread. Threaded jaws, having undersize major thread diameters, cannot be capped properly because of insufficient thread engagement between the container and the cap or closure. Thus, the threaded or sealing surface of a jar or other container may have a diameter greater than the maximum permissible diameter or less than the minimum permissible diameter and thus be unsuitable for its intended use. Even if such a sealing or threaded surface has a diameter within allowable maximum and minimum limits, it may be defective because of excessive "out-of-roundness," i. e., departure from true circularity at any level, or because a portion thereof has a flat face or bulges or has a shoulder, seam or protrusion thereon, or an indentation or depression therein. Obviously such defects, which would render a jar or other container unsuitable for its intended use, should be ascertained immediately after their occurrence in a glass operating period or run of a forming machine by which such jars or containers are being made. Once the defect in the product has been ascertained, the cause thereof may be readily ascertained and eliminated.

An object of the present invention is to provide a gauge which a workman in a glass container manufacturing plant or other appropriate place can use manually to determine quickly, easily and accurately whether or not the outer peripheral surface or threaded area of the finish or top portion of a glass container or the like is satisfactory for its intended use.

A further object of the invention is to provide a gauge of the character described which can be used to show whether or not all possible diameters of the sealing surface or threaded area of a glass container being gauged come within a permissible range and also to what extent and in what manner if at all, the region being gauged is irregular or "out-of-round" at any point or all points along its circumference.

A further object of the invention is to provide a gauge of the character described which is of compact form and construction and is not likely to be injured or put out of order.

Figure 2:
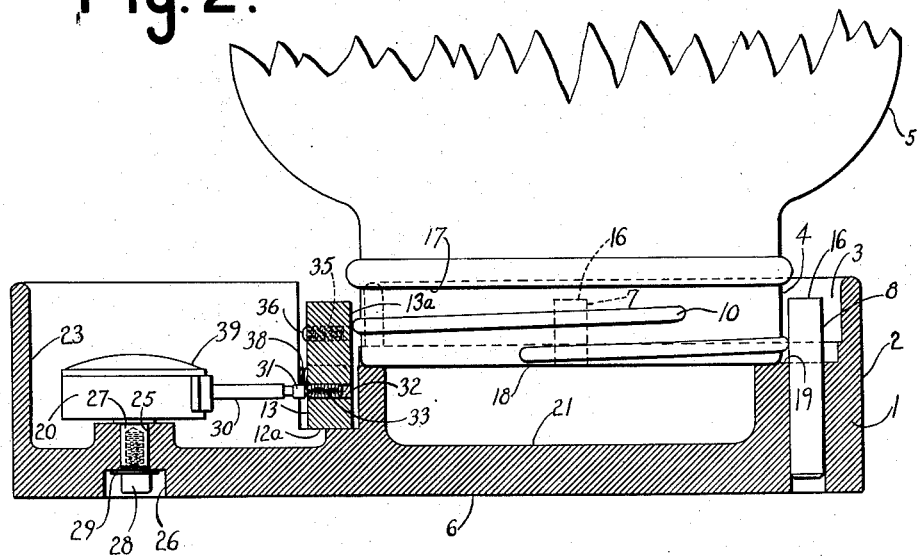

Other objects and advantages of the invention will hereinafter be pointed out or become apparent from the following description of structural features and a mode of use of an illustrative example of a gauge embodying such invention, as shown in the accompanying drawings, in which:

Fig. 1 is a top plan view of the gauge, showing by full and dotted lines different positions of several movable parts thereof, and Fig. 2 is a section 1—1 of Fig. 1 showing the illustrative gauge in vertical section with a glass jar, which is shown in side elevation, in gauging position.

The illustrative gauge shown in the drawings comprises a body, generally designated by reference numeral 1, which may be made of aluminum or any suitable material in any suitable known way. The portion of the gauge, designed to receive the portion of the jar or like article to be gauged, is of circular cross sectional configuration and comprises an upturned annular wall 2, defining a cavity 3 having a sufficiently large internal diameter that the finish portion 4 of a jar 5 can fit loosely therein. Gauge body 1 has a substantially flat base surface 6 upon which the gauge rests when in gauging position.

Within the gauging cavity 3 are three locating pins 7, 8 and 9. One end of each of these locating pins is fixed within gauge body 1. The positioning of these pins is such that the longitudinal axis of each pin is vertical and parallel to the axis of the article being gauged. The jar 5 is such an article and is shown in a suitable position for the gauging of its threaded finish portion 10.

One side of the gauging cavity 3 has an opening 11 which communicates with a transverse slot 12. Within slot 12 is pivoted a movable gauging contact element 13 in the form of a horizontally swingable lever. The gauging contact element 13 pivots about pin 14, the lower end of which is permanently fixed within gauging body 1. Pin 14 has its axis vertical and parallel to locating pins 7, 8, and 9. The movable gauging contact element 13 is prevented from being displaced vertically downward by means of a flat horizontal surface 12a, formed in gauging body 1 as the bottom transverse surface of slot 12. The movable gauge contact element 13 is prevented from being displaced vertically upwards by means of a pin, such as cotter pin 15, which intersects the upper extremity of pivot pin 14.

The slot 12 is so shaped that movable gauging contact element 13 has a limited swinging movement about its pivot pin 14, shown by full and dot-and-dash lines in Figure 1. When element 13 is rotated towards the gauging cavity 3, the gauging face 13a of the movable contact element 13 is brought into measuring contact with the article to be gauged. This gauging face is of substantial vertical extent so that it may contact at least several threads on the jar finish or a peripheral surface of substantial extent on a glass article being gauged.

Locating pin 8 is so positioned as to be diametrically opposite the line of contact between gauging surface 13a and threaded area 10 of jar 5. Locating pins 7 and 9 are each mounted 90° from locating pin 8. The radial location of all the locating pins from the center point of the gauging cavity is such that the innermost lateral surface element of each locating pin forms a guide to approximately center jar 5. The top flat surface of movable gauging contact element 13 and the flat ends 16 of the locating pins lie within the same horizontal plane. Thus, when jar 5 is located within pins 7, 8, and 9, said jar will be centralized and the flange 17 will not interfere with ends 16 of the locating pins or the top flat surface of the movable gauging contact element. The finish end face 18 of the jar rests on a flat horizontal shoulder 19 which is formed on the wall of the gauging cavity 3. Shoulder 19 is also useful for setting the dial indicator 20 in operative condition, as will be described hereinafter.

A recess 21 may be provided in the bottom of the gauging cavity to eliminate material and thereby reduce the weight of the gauge.

An extension 22 is provided on gauge body 1. Within this extended portion, a cavity 23 is formed for protectively retaining indicator 20. A slot 24 is cut through one side of the indicator cavity and is so located as to communicate with slot 12. A vertical bore or aperture 25 is provided through the extended section 22 of gauge body 1. Concentric with bore 25 is a counterbore 26. Indicator 20 has a vertical socket 27 which is inserted in bore 25 but which is not sufficient in length to extend through to counterbore 26. Socket 27 is internally threaded in order to receive cap bolt 28. The head of cap bolt 28 bears on washer 29 which, in turn, bears on the bottom of the counterbore. Tightening cap bolt 28 into indicator socket 27 releasably secures indicator 20 to gauging body 1. Counterbore 26 provides a recess for the head of cap bolt 28 such that the bolt head does not project beyond the base surface 6.

Indicator 20 has a longitudinal tubular stem housing 30 extending in slot 24 towards the movable element 13. A longitudinally movable indicator stem 31 extends from the housing to a position where it can be actuated by movable element 13. The movable element 13 has a threaded hole 32 whose axis is coincident with the axis of the longitudinally movable indicator stem 31. In the hole is a set screw 33 which is adjustably movable so as to set hand 34 of indicator 20 to a predetermined position, as will be described hereinafter. A second threaded hole 35, whose axis is parallel to the first threaded hole, is provided in movable gauging contact element 13. Within threaded hole 35 is located a second set screw 36. Set screw 36 is so located that by extending it in the direction towards indicator 20 the degree of rotation of movable element 13 is limited in that direction. A pocket 37 is also provided within element 13 to retain spring 38. The action and location of spring 38 is such as to induce element 13 to rotate about pivot pin 14 in the direction of gauging cavity 3.

The particular indicator shown in the drawing is a commercial unit which is supplied by the Federal Products Company of Providence, Rhode Island, as their "Federal Dial Indicator, Model A-6Q." It has a circular dial which faces upward when the indicator is mounted as described, this dial being designated as 39 in Fig. 1. The dial has a circular series of graduations thereon for showing dimensional variations in thousandths of an inch from an index dimension which is indicated when the pivoted indicator hand or pointer 34 registers with the right-hand graduation 40, as shown in full lines in Fig. 1. The pointer is moved angularly about the dial in response to longitudinal movement of the stem 31 in the manner usual in dial indicators. The graduations, which extend in a semi-circle on the upper half of the dial, Fig. 1, between the graduation 40 and a diametrically opposite graduation 41, constitute a "minus" scale, designated as 42. The corresponding graduations on the lower half of the dial constitute a "plus" scale designated 43. These scales are appropriately marked for easy, accurate reading of dimensional variations from zero to twenty thousandths of an inch, "plus" or "minus," according to whether the pointer 34 is swung clockwise from its full position, as through the position indicated by the dotted lines, or counterclockwise, as through the position indicated by dot-and-dash lines, respectively. Inward movement of the stem 31 in its housing will cause a clockwise swinging movement of the pointer and, of course, the pointer will swing in the opposite direction or counterclockwise when the movement of the stem in its housing is outward.

The dial indicator, per se, does not form part of the present invention but is a commercial unit of a type well known to those skilled in the art to which the present invention relates. It, therefore, is unnecessary further to illustrate or describe the particular indicator above referred to. Any other suitable known indicator or comparator may be used in lieu thereof.

The locating pins may be formed of hardened steel or other wear-resisting material.

It will be noted that the indicator and all movable parts of the gauge are housed by the gauge body so as to be protected against shocks and jars. The gauge is not likely to be injured or its utility impaired should it be accidentally dropped from the hand of the user onto a factory floor or knocked about while it is lying on a bench or other supporting structure.

The illustrative gauge shown in the drawings and hereinbefore described may be used substantially as follows: The presetting of the movable contact element 13 may be accomplished by inserting within gauging cavity 3 a circular master gauge disc (not shown), having a diameter equal to the mean preferred diameter of the portion of a jar or like article which is to be gauged. This circular master gauge disc has a flat lower surface which is placed on the horizontal shoulder 19 of the gauging cavity. Movable gauging contact 13 is forced by spring 38 against the circumferential side of the gauge disc which is approximately centered by the three vertical locating pins. While contact surface 13a of element 13 is resting against the gauge disc, indicator 20 should have a zero reading, i. e., hand 34 should line up with indicator graduation 40. To establish the zero reading of the indicator, set screw 33 is adjusted in its threaded hole 32. In order to make this adjustment, it is necessary to remove cotter pin 15 and then to raise contact element 13 from its pivot pin 14. The master gauge disc should be removed from gauging cavity 3 and set screw 36 should be adjusted in its threaded hole 35 so as to limit the swing of contact element 13 in the direction of indicator 20 so as to give a maximum indicator reading of "plus" twenty thousandths of an inch.

After the gauge has been properly adjusted in accordance with the foregoing, the distance between the innermost lateral surface element of locating pin 8 and a line of contact on element 13 diametrically opposite said locating pin will be the mean preferred diameter of the threaded surface or end portion of the jar when the indicator has a zero reading.

Locating pins 7 and 9 should be properly spaced from each other in the basic design of the gauge. The dimension between the innermost lateral surface elements of these locating pins should equal the maximum permissible diameter of the article to be gauged.

Having preset the contact element in the manner described, the jar may then be inverted and the end to be gauged placed within the gauging cavity, substantially as shown in Fig. 2, with the gauge body resting upon any suitable flat surface (not shown). The gauge being held steady by one hand of the operator, the operator may then turn or rotate the jar about its axis by the fingers of his other hand while he holds the gauge against rotation and while the lower end portion of the jar is kept approximately centered in chamber 3 and against the contact face 13a of the movable gauging contact element 13. As the jar is turned or rotated about its vertical axis relative to the gauge, variations from the standard mean or preferred diameter will be shown by the indicator, the pointer moving clockwise whenever the diameter exceeds the standard mean dimension and counterclockwise when the diameter falls below the standard mean or preferred dimension. Should the portion of the jar being gauged have a diameter above the permissible maximum diameter, that fact will be instantly shown by cramping or binding of the jar top between the oppositely fixed locating pins 7 and 9 and the jar may be then immediately rejected without further gauging. Of course, the extent of the departure, either in an upward or downward direction from the standard mean or preferred dimension, may be shown up to twenty thousandths of an inch by the particular dial indicator of the gauge shown in the drawings.

It will be understood that the finish or rim portions of practically all jars, or like containers, are more or less "out-of-round." If the "out-of-roundness" is not excessive and if the change of contour is gradual and regular, the departure from the ideal condition will not preclude satisfactory capping and sealing of the jar. However, even if the departure should not be in excess of that which is allowable under the standard specifications, a jar may be unsuitable for capping and sealing if its sealing surface is "out-of-round" in an objectionable manner, as by having an abrupt shoulder, seam or protrusion thereon, by having a portion which bulges outwardly or by having indentations or depressions therein. These faults may be caused by misalignment or maladjustment of parts of the glassware forming machine or by some defect in a glassware forming mold, or other forming machine defect. When the gauge of the present invention is used, the presence of any such defect in the sealing surface on a jar is at once indicated so that it can be traced immediately to its cause and the cause eliminated. Thus, continuous use of the gauge to check jars or similar containers during the course of production of such jars by a forming machine will enable an operator to correct or cure any faults in the forming machine which, if unnoticed and uncorrected, would occasion loss of a considerable part of the production of the machine. The gauge, therefore, is advantageously usable as a production control instrument. It may also be used for occasional or "spot" gauging of jars or similar containers by the inspection department of a glassware manufacturing plant or at any other time or place at which ascertainment of the condition of the rim or finish portion of a jar or other container is of interest or importance.

Obviously, many changes in and modifications of the illustrative gauge shown in the accompanying drawings and hereinbefore described will now be obvious to those skilled in the art; and I, therefore, do not wish to be restricted to the details of such gauge.

I claim:

1. A gauge comprising a substantially flat body formed in its top portion to define two adjacent parallel open cavities mutually communicating through a common lateral opening, one of said cavities being formed in part to receive loosely and to support in a vertical, centralized position the finish portion of an inverted jar or like article, the second cavity being formed to protectively retain an indicating means, a lever disposed in the communicating opening joining said cavities and pivoted to swing horizontally therein toward and away from the center line of the first cavity, yieldable means cooperative with said body to urge said lever to swing about its pivotal axis toward the center line of the first cavity so as to bear in measuring relationship along a line of contact on said portion of said article to be gauged in said first cavity, an indicator disposed in said second cavity in working relationship to said lever, said indicator showing the movements of said lever responsive to variations in the different diameters of said portion of said article being gauged during a cycle of relative rotation between the gauge body and the article being gauged about the axis of the latter.

2. A gauge comprising a substantially flat body having a cavity formed in the upper portion of said body and adapted for the reception of an end portion of a glass jar or like article and providing sufficient side clearance to permit relative rotation therebetween about the axis of said article, said body being formed in part to define a second cavity in the upper portion of said body, said second cavity being formed to protectively retain indicating means, said body having a transverse slot disposed between said cavities and mutually communicating with said cavities through openings in the sides thereof, a movable gauging contact element disposed in said slot and pivoted for a limited swinging movement about a vertical axis, yieldable means associated with said gauging contact element to swing it about said pivotal axis in a direction to carry said contact element into measuring relationship with said portion of said article to be gauged in said first named cavity, said gauging contact element being of sufficient vertical extent to form a vertical line of contact between said gauging contact element and said portion of said article being gauged, a vertical locating pin mounted within said first named cavity diametrically opposite said movable gauging contact element, said locating pin and said movable gauging contact element being suitably formed to centralize said article in position within said first named cavity, an indicator mounted within said second named cavity in a working relationship to said movable gauging contact element such that said indicator will be operated as said gauging contact member swings about its pivotal axis, said indicator showing variations between the different diameters of said portion of said article being gauged by said contact element during a cycle of relative rotation between the gauge body and the article being gauged.

3. A gauge for a glass jar or like container having an externally threaded finish or rim portion, said gauge comprising a body having a cavity formed in one face thereof adapted to receive said externally threaded finish or rim portion of such a container loosely enough to permit relative rotation about the axis of the container between the container and the wall of said cavity, said cavity being partially open at one side thereof, a plurality of cooperative gauging elements carried by said body in position respectively to contact with the threaded finish or rim portion of the container in said cavity at angularly spaced places around the center line of said cavity and along lines parallel to said center line, one of said gauging elements being positioned at said partially open side of said cavity and being horizontally movable toward and away from said center line of the cavity, said movable gauging element being formed to have contact with the threaded finish or rim portion of the container in said cavity on a line extending across several adjacent threads thereon during part of a complete rotation of said container about its axis relative to the wall of said cavity, and an indicator mounted in a second cavity in said face of said gauge body and operatively connected with said movable gauging element.

HENRY W. INGLE.

REFERENCES CITED

The following references are of record in the file of this patent:

UNITED STATES PATENTS

| Number | Name | Date |
|---|---|---|
| 1,139,936 | Warner | May 18, 1915 |
| 1,446,149 | Benoit | Feb. 20, 1923 |
| 1,648,497 | Moore | Nov. 8, 1927 |
| 2,258,760 | Hecker | Oct. 14, 1941 |
| 2,413,841 | Minuto | Jan. 7, 1947 |
| 2,415,693 | Ingle | Feb. 11, 1947 |